(12) United States Patent
Farchi et al.

(10) Patent No.: US 7,055,065 B2
(45) Date of Patent: May 30, 2006

(54) METHOD, SYSTEM, AND COMPUTER PROGRAM PRODUCT FOR AUTOMATED TEST GENERATION FOR NON-DETERMINISTIC SOFTWARE USING STATE TRANSITION RULES

(75) Inventors: Eitan Farchi, Pardes Hana (IL); Alan Hartman, Haifa (IL); Paul Kram, Lowell, MA (US); Kenneth Nagin, D.N. HaMovil (IL)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 09/946,248

(22) Filed: Sep. 5, 2001

(65) Prior Publication Data

US 2003/0046609 A1 Mar. 6, 2003

(51) Int. Cl.
*G06F 11/00* (2006.01)
(52) U.S. Cl. ............................ 714/38; 714/37; 717/124
(58) Field of Classification Search .................. 714/38, 714/30, 37; 717/124
See application file for complete search history.

(56) References Cited

U.S. PATENT DOCUMENTS

| | | | |
|---|---|---|---|
| 5,463,770 A | 10/1995 | Todd | 395/600 |
| 5,708,774 A | 1/1998 | Boden | 395/183.14 |
| 5,754,760 A | 5/1998 | Warfield | 395/183.14 |
| 5,815,654 A * | 9/1998 | Bieda | 714/38 |
| 5,862,364 A | 1/1999 | Todd | 395/500 |
| 5,903,453 A * | 5/1999 | Stoddard II | 700/79 |
| 5,913,023 A | 6/1999 | Szermer | 395/183.14 |
| 5,918,037 A | 6/1999 | Tremblay et al. | 395/500.03 |
| 5,946,493 A * | 8/1999 | Hanson | 717/124 |
| 5,999,717 A | 12/1999 | Kaufmann et al. | 395/500.23 |
| 6,074,426 A | 6/2000 | Baumgartner et al. | 703/13 |

(Continued)

OTHER PUBLICATIONS

Aegdis—Automated Generation and Execution of Test Suites for Distributed Component Based Software, Project Proposal—Part B, pp. 1-38, printed May 23, 2000.

(Continued)

*Primary Examiner*—Robert Beausoliel
*Assistant Examiner*—Yolanda L. Wilson
(74) *Attorney, Agent, or Firm*—Synnestvedt & Lechner LLP; John D. Flynn

(57) ABSTRACT

The present invention enables the modeling of plural outcomes resulting from a single stimulus, thereby allowing for automated test generation for non-deterministic software. In accordance with the present invention, a method, system, and computer program product are disclosed for testing software having a non-deterministic outcome. In accordance with the present invention, a set of rules is created, each rule having an associated stimulus, a precondition computation, and a computation procedure to produce the set of all valid outcome states. Each valid outcome state models one of several states that may result from applying the stimulus to any state which satisfies the precondition computation. Using these models, a test generation program is executed against the set of rules to recursively expand each path associated with an outcome state of a rule and outputting a list of valid possible outcomes, then selecting sequences of stimuli in accordance with coverage goals set by the test engineer. A test execution engine is then run against the application under test applying the sequences of stimuli to the software and a list of observed states resulting from the application of the stimuli is compiled. Finally, the list of observed states is compared with the list of valid possible outcome states to identify defects (as well as to identify correct outcomes) in the application under test and ensure the attainment of the coverage goals.

15 Claims, 4 Drawing Sheets

U.S. PATENT DOCUMENTS

| | | | |
|---|---|---|---|
| 6,128,759 A | 10/2000 | Hansen | 714/738 |
| 6,212,675 B1 | 4/2001 | Johnston et al. | 717/4 |
| 6,260,065 B1* | 7/2001 | Leiba et al. | 709/224 |
| 6,385,741 B1* | 5/2002 | Nakamura | 714/38 |
| 6,601,017 B1* | 7/2003 | Kennedy et al. | 702/182 |
| 2002/0178402 A1* | 11/2002 | Tsai | 714/38 |
| 2003/0046626 A1* | 3/2003 | Hand et al. | 714/738 |

OTHER PUBLICATIONS

Aegdis—Automated Generation and Execution of Test Suites for Distributed Component Based Software, Project Proposal—Part C, pp. 1-20, printed May 23, 2000.

Gronau et al., IBM Research Laboratory in Haifa Technical Report, "A Methodology and Architecture for Automated Software Testing," pp. 1-17, 2000.

"Syntax of GDL Foci, GOTCHA TCBeans," IBM Haifa Research Laboratory.

"SPIN'2000", The 7th Intl. SPIN Worskshop on Model Checking of Software, Stanford University, CA, Aug. 30-31, Sep. 1, 2000, pp. 1-4, printed Jun. 6, 2000.

"A Fully Abstract Model for Concurrent Nondeterministic Processes Based on Posets with Non-Actions," http://www.informatik.uni-hamburg.de/TGI/pnbib/c/cherkasova_12.html, printed Jun. 5, 2000.

SPIN99—Papers from the 5th Intl. SPIN Workshop, http://netlib.bell-labs.com/netlib/spin/ws99a/program99.html, printed Jun. 6, 2000.

SCARP, http://icee.cs.umass.edu/SCARP.htm, pp. 1-5, printed Jun. 5, 2000.

"On-the-Fly, LTL Model Checking with SPIN," http://hetlib.bell-labs.com/netlib/spin/whatispin.html, pp. 1-4, printed Jun. 6, 2000.

Gallardo and Merino, "A Framework for Automatic Construction of Abstract Promela Models," (no date available).

Dwyer and Pasareanu, "Model Checking Generic Container Implementation," http://www.cis.ksu.edu/~dwyer/papers/containermc.t, printed Jun. 6, 2000.

U.S. Appl. No. 09/847,309, "Technique Using Persistent Foci for Finite State Machine-Based Test Generation," filed May 31, 2001.

Carver & Tai, "Use of sequencing constraints of specification-based testing of concurrent program," IEEE Transactions of SW Engineering, vol. 24, No. 6, pp. 471-490 (Jun. 1998).

* cited by examiner

METHOD, SYSTEM, AND COMPUTER PROGRAM PRODUCT FOR AUTOMATED TEST GENERATION FOR NON-DETERMINISTIC SOFTWARE USING STATE TRANSITION RULES

CROSS REFERENCE TO RELATED APPLICATIONS

The present patent application is related to concurrently filed patent application Ser. No. 09/946,255 entitled A Method and System for Combining Multiple Software Test Generators and owned by the assignee of the present invention.

BACKGROUND OF THE INVENTION

1. Field of the Invention

The present invention relates in general to the field of software testing, and more particularly, to an improved method, system, and computer program product for generating tests for non-deterministic software.

2. Description of the Related Art

As the use of computers has increased over the past several decades, software development has become an important, and quite lucrative, industry. A critical element to successfully bringing software to the marketplace is the ability to quickly and thoroughly test the software while minimizing the impact on the development schedule.

To speed up the process of generating test suites, more recently software testers have turned to automated test generators (e.g. Object Geode by Telelogic) which utilize "behavioral models" and coverage criteria to automatically generate the test suites. The behavioral model is a formal description of part of the behavior of the software under test, and this behavioral model can be utilized by an automated test generator to generate a test suite according to separately defined coverage criteria. Coverage criteria typically comprise an informal list of tasks to be accomplished by the test suite. This may be a subset of states, transitions, or paths within the software under test that need to be covered by the test suite.

In a typical use of an automated test generator, a test engineer writes behavioral models in a formal modeling language that is "understood" by the automated test generator being used. For example, test engineers may use finite state machines to model externally observable behavior of a program under test. They then input the models and coverage criteria to an automated test generator to generate test cases that are combined to form the test suite. There are many well-known methods of this type as disclosed in commonly assigned co-pending U.S. patent application Ser. No. 09/847,309 entitled "Technique Using Persistent Foci for Finite State Machine-Based Test Generation," filed on May 31, 2001, incorporated herein fully by reference.

Non-determinisitic software is software that is implemented such that multiple outputs (referred to herein as "outcome states") may occur for the same input sequence (referred to herein as a "stimulus") and system state (referred to herein as a "current state"). While this is extremely important to the growth in software development and to the implementation of distributed processing, non-deterministic software creates significant challenges for those who test the software, in that a given stimulus and current state cannot guarantee a unique output state. One form of non-determinism common in software development today involves non-determinism of the software itself where there can be multiple correct output states for a single set of stimuli.

A simplistic example of this form of non-determinism can be found in file systems and the mechanism by which access is allowed to files. In a network environment, for example, multiple users of a word processing program may have access to text files stored in a common network drive. When a user "A" wishes to access a particular file (e.g., "Hartman.doc") from a "current state" (e.g., while viewing a list of file names in a word processing program), user A "double clicks" on "Hartman.doc" from the file list, resulting in the opening of the file "Hartman.doc" into the word processing program for editing. The act of "double clicking" is a stimulus applied to a current state (the display of the file list) which causes a valid outcome state, i.e., the opening of the file.

However, suppose two users "A" and "B" simultaneously attempt to access this file for purposes of editing. If users A and B are simultaneously allowed access to "Hartman.doc" and each edits the file, two different "originals" of the same document will be created, and when they are saved, one will overwrite the other. To avoid this occurrence, many file systems are designed to allow access to a particular file by more than one user, but only one user at a time may alter a file's contents. Thus, the result occurring from a single stimulus, e.g., double clicking on the file "Hartman.doc," is two (or more) different but valid outcome states. One valid outcome state is that user A is given writing access to the file to the exclusion of all others, and the second valid outcome state is that user B is given writing access to the file to the exclusion of all others.

For purposes of testing, this presents a dilemma. In the scenario described above, applying a single stimulus to software in a current state will have more than one correct outcome state. Thus, if the test is performed and a "pass" response is received, all that is known is that one of the correct paths passed the test, and nothing is known about the alternative path(s).

Prior art attempts have been made to overcome this problem. There are three main approaches to the testing of non-deterministic software:

Non-deterministic testing: Each test case is run many times and the actual outcomes are observed each time. This mode of testing suffers from three main problems: First, certain outcomes may be repeated many times, which is inefficient use of testing resources. Second, some outcomes which are valid may never be observed, due to their having a low probability of occurrence. Third, and most serious, is that it is impossible to detect with certainty a defect in the program which actually does not implement all the possible outcomes.

Deterministic testing: In order to force the program to exercise all possible outcomes, code is added to the program, or to the operating system, which gives the tester more control over the outcomes of a stimulus. This method of testing is preferable, but in many cases it is impossible since the tester does not have access to the source code of the program under test.

Interleaving test generation and execution: In this method the stimuli to be applied to the program are not predetermined, but chosen in response to the observed outcome of prior stimuli. This interleaving requires the use of scarce computing resources for both the tasks of test execution and next stimulus selection concurrently. Often this is not feasible due to the time sensitivity of the program under test, and it may also change the behavior of the program due to the increased delays between stimuli. Furthermore, it also suffers from the same problems as non-deterministic testing in that it is impossible to detect with certainty a defect in the program that actually does not implement all the possible outcomes. See Carver and Tai, "Use of sequencing constraints for specification-based testing of concurrent program," IEEE Transactions of SW Engineering, Vol. 24, No. 6, pp. 471–490 (June 1998).

Accordingly, it would be desirable to have the ability to model more than one behavior based upon a single stimulus, thereby allowing for automated test generation for non-determinisitic software.

SUMMARY OF THE INVENTION

The present invention enables the modeling of plural outcomes resulting from a single stimulus, thereby allowing for automated test generation for non-deterministic software. In accordance with the present invention, a method, system, and computer program product are disclosed for testing software having a non-deterministic outcome. In accordance with the present invention, a set of behavioral rules is created, each rule having a precondition and one or more valid outcome states. Each rule is a description of a stimulus or concurrent set of stimuli to the application under test (AUT). Each valid outcome state models one of several states that may result from applying the stimulus at any state which satisfies the precondition. The precondition of a rule is a filter for selection of states where the stimulus may be applied to the AUT.

Using these models, a model enumeration and test generation program is executed against the set of rules to recursively expand each path associated with an outcome state of all rules in every possible state of the application under test and outputting a list of valid possible outcomes. After completing the enumeration of all rules and their outcomes (or possibly during the enumeration) the test generator selects certain paths which satisfy the coverage criteria and outputs the selected paths as a test suite for the AUT. A test suite consists of a set of paths. Each path is referred to as a test case. Each test case is a sequence of stimuli and the expected outcome(s). A test execution engine then runs the test suite against the AUT so that one or more stimuli are applied to the software and a list of observed states resulting from the application of the stimuli is compiled. Finally, the list of observed states is compared with the list of valid possible outcome states to identify defects (as well as to identify correct outcomes) in the application under test.

DETAILED DESCRIPTION OF THE PREFERRED EMBODIMENTS

The present invention involves the performing of four basic steps in connection with testing of an application: first, a set of rules is created. Each rule represents a stimulus to the AUT and includes a precondition for its application and models the valid outcome states that may result from applying its stimulus in a particular state of the AUT; second, the rules are executed to expand (enumerate/explore) all paths associated with all the outcome states and a data structure incorporating the path information is created; third, a subset of all of the paths enumerated is selected, taking into consideration user defined coverage criteria, to form the test suite; and fourth, a test execution engine is run which runs the test suite and applies its sequences of stimuli to the AUT, compiles a sequence of observed states, and compares the list of valid possible outcomes with the sequence of observed states. As a result of this comparison, bugs can be identified.

Figure 1:
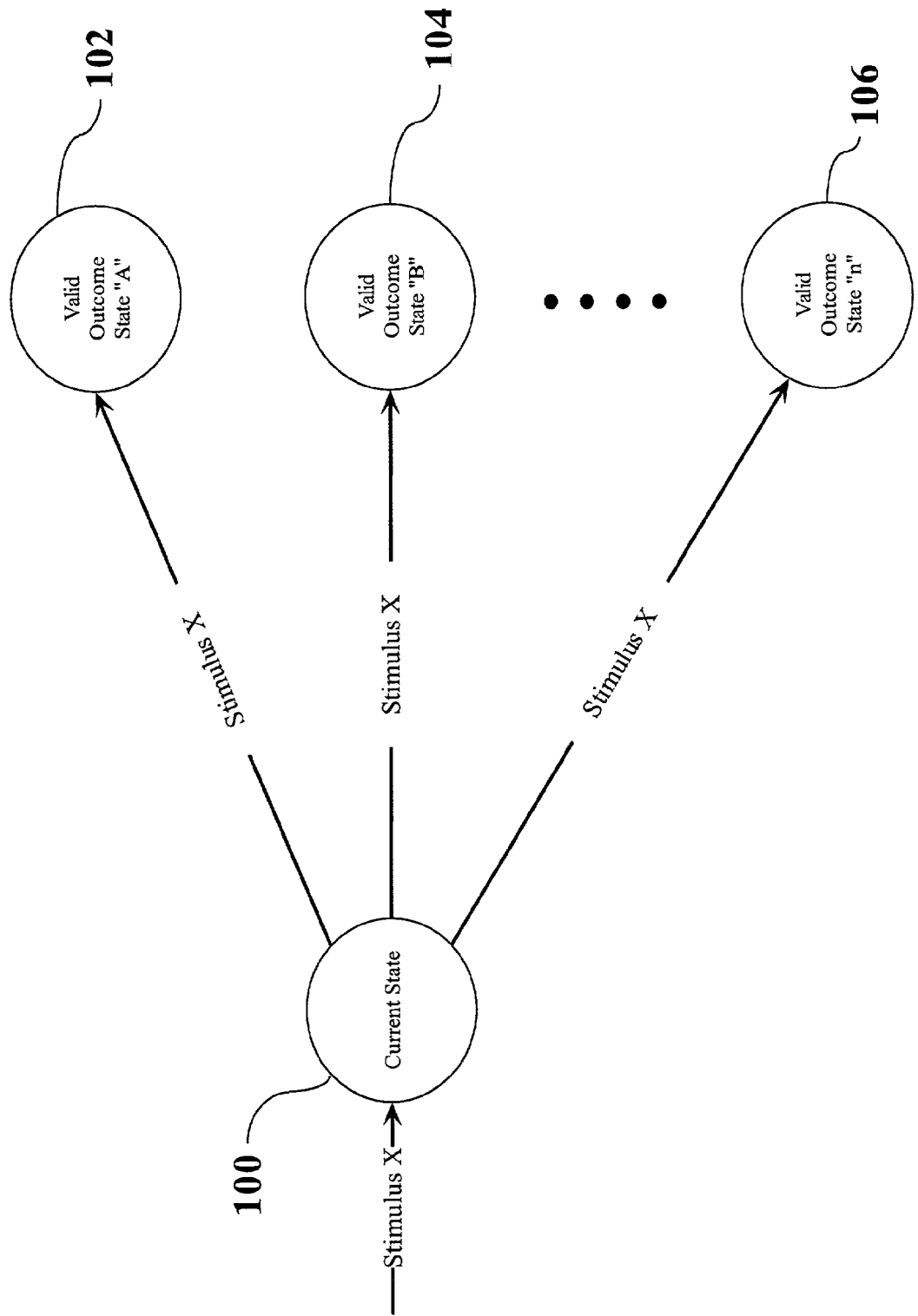
FIG. 1 is a directed graph illustrating the fundamental structure of a non-deterministic segment of a software program.

FIG. 1 is a directed graph illustrating the fundamental structure of a non-deterministic segment of a software program. A "current state" 100 represents the state which is being analyzed (also known as the state being "explored" in graph theoretical parlance) at a particular point in time. When a stimulus X is applied to current state 100 valid outcome states 102, 104 . . . 106 can result. Correlating the graph in FIG. 1 to the example given above, current state 100 corresponds to the state where the file list containing "Hartman.doc" is available to be accessed by the users of the network; valid outcome state 102 corresponds to the result where user A is given access to Hartman.doc and user B is denied access; and valid outcome state 104 corresponds to the result where user B is given access to Hartman.doc and user A is denied access. Stimulus X corresponds to the act of all users A, B, . . . , n, double-clicking on Hartman.doc simultaneously.

The directed graph illustrated in FIG. 1 describes how a stimulus, applied to a particular state, may have two or more valid outcomes when presented to the AUT in that state. The valid outcome states 102, 104 . . . 106 model the several states which may result from applying a stimulus to the current state. A stimulus (also referred to herein as a "rule") consists of three parts: it's "name", which is the stimulus applied to the AUT; a "precondition", which filters the set of states where that rule (or stimulus) may be applied; and a "list of outcome states" or procedure for computing a list of outcome states. The directed graph of FIG. 1 is an illustration of one particular application of a rule, where the name of the rule is X, a state which satisfies the precondition is on the left of all the arrows labeled X, and the list of outcome states is on the right of all arrows labeled X.

During the exploration phase, when the state exploration component of a test generation program of the present invention encounters a state that satisfies the precondition of a rule, the state exploration component performs "what-if" scenarios at each state it encounters in its exploration of the possible states of the AUT. The state exploration component of the test generator starts from a particular state (the "current state") of the AUT, and looks at all possible outcome states after applying a particular stimulus to the current state.

The state exploration component of the test generator starts with a known set of initial states of the AUT and applies each of the stimuli to one of them. A set called the "Reachable Set" is generated which lists all states that can be reached by applying sequences of stimuli from the initial states. A set called the "Frontier Set" is also generated which is a list of states that are still in the process of being explored; thus, once a state has had all of its outcome states explored, it is removed from the Frontier Set. At the beginning of the process, both sets (Frontier and Reachable) are initialized to place all of the initial states into both the Reachable Set and the Frontier Set. These lists comprise a list of valid possible states of the AUT.

Figure 2:
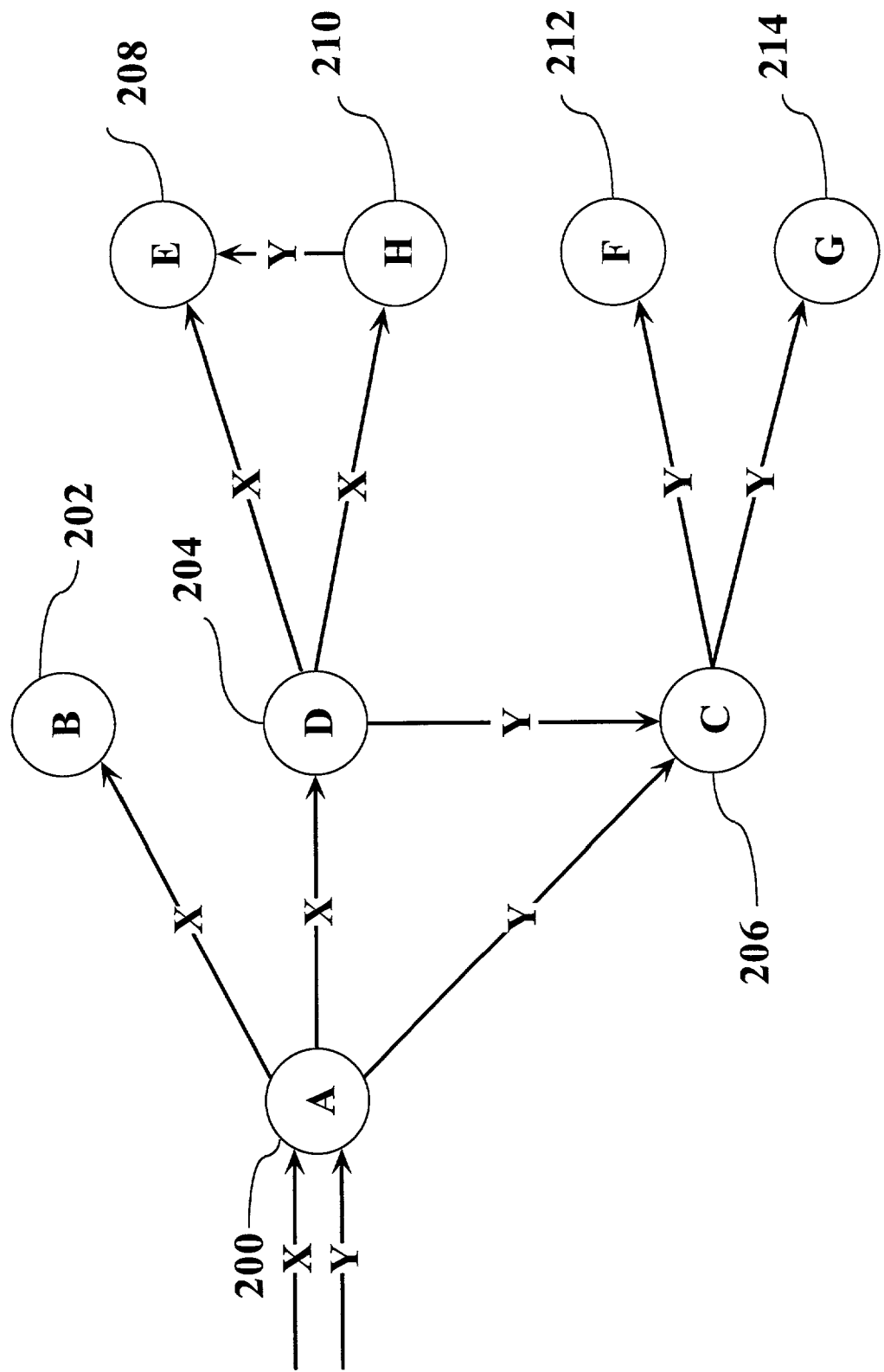
FIG. 2 illustrates an example of the operation of the present invention in connection with plural states and to stimuli.

FIG. 2 illustrates an example of the operation of the present invention in connection with a series of states A through H and two stimuli, X and Y. In this example, the initial state is state A. The initial Frontier Set and the Reachable Set are initialized so that Frontier Set=Reachable Set={A}. The state exploration component first chooses a state from the Frontier Set; at this point in the example, the only choice is state A. Valid stimuli in a particular state are specified by the preconditions of the rules governing those stimuli. These preconditions take the form of a computation that is performed at each state, when it is the current state. The states contain this information, and this information causes the computation to output a true (valid) or false (invalid) condition, depending on the state and stimulus. Thus, the precondition of a rule forms a "filter" which allows the stimulus to be applied in some states but not others.

In this example, stimulus X is applied to state A, and states B and D are identified as valid outcome states which result from the application of this stimulus to state A. A second stimulus Y is applied to state A, and from the application of this stimulus, state C is identified. At this point, states B, D and C are all reachable and they are added to the set of reachable states, i.e, Reachable Set={A, B, C, D}. Further, since no other stimuli are applicable to state A, it is removed from the Frontier Set, i.e., Frontier Set={B, C, D}.

Next, from the Frontier Set, another state, state C is selected. Thus, state C now becomes the current state and is expanded by exploring the outcomes of all stimuli applied to it (in this case, X and Y). State C does not satisfy the preconditions of rule X, but it does satisfy the preconditions of rule Y, so only stimulus Y results in valid outcomes, and upon application of stimulus Y to state C, states F and G are identified as the valid outcomes. No other stimuli affect state C, so state C is removed from the Frontier Set and state F and G are added to the Reachable Set, i.e., Reachable Set=({A, B, C, D, F, G} and Frontier Set={B, D, F, G}.

Selecting another state from the Frontier Set, e.g., state D, all appropriate stimuli are applied to that state. Application of stimulus X leads to new states E and H, both of which are added to the Reachable and Frontier Sets. Stimulus Y leads to state C, which is already reachable, so the Reachable Set need not be modified. Further, since no additional stimuli can be applied to state D, it is removed from the Frontier Set. Thus, at this point, Reachable Set={A, B, C, D, E, F, H} and Frontier Set={B, E, F, G, H}. This process continues recursively until all states have been explored. At this point, all of the possible states of the AUT have been enumerated, and it is possible for the test generator to select certain paths as its test suite with full knowledge of the application under test. Note that test case selection may take place before all of the states have been explored using only partial knowledge (this is referred to in the literature as "on-the-fly" test generation).

The choice of which state to be selected from the Frontier Set should be performed in a controlled manner, based upon the needs of the test developer. For example, selecting states on a first-in-first-out basis creates certain types of test paths more readily. This selection strategy is known in the art at "breadth-first searching" and facilitates the creation of short test cases (paths). Another possible selection strategy, known as a "depth-first search," selects states based on a last-in-first-out basis. This strategy results in very long test cases.

In accordance with the present invention, states are selected according to their relationship with the coverage criteria. As described in more detail in connection with the examples presented below, states are selected from the Frontier Set based on what is perceived to be the shortest/best route to achieve the coverage goal.

The purpose of performing the exploration of the various states resulting from application of stimuli to the current state is so that the test generator can "understand" the AUT and generate test cases (i.e., sequences of stimuli or "rules") which go through the various states, and to identify complex execution paths which may expose bugs in the AUT. An execution path is a sequence of stimuli and the expected responses (or outcomes). During the exploration, the test generator builds a task list which is a list of "interesting" places (those places or features described by the coverage criteria) in the state graph (a state graph is the result of a completed state exploration and is usually a much more complex version of the simple directed graphs illustrated herein) being explored. The test generator then outputs paths (sequences of stimuli and expected responses) to these interesting states either during exploration (on-the-fly) or after the exploration is complete.

Once the test generator has done its work, i.e., producing a sequence of stimuli and expected responses, the test execution engine applies these stimuli one at a time to the AUT. If the response of the AUT matches one of the valid responses predicted by the state diagram, then all is known to be functioning properly. If, however, the response of the AUT does not match one of the valid responses predicted by the state diagram, then a bug has been identified in either the AUT or in the state diagram. The test execution engine can use the information supplied by the test generator concerning the expected outcomes of a particular stimulus in various ways. It may automatically re-run test cases, which do not fail, but do not reach the desired coverage task because of non-determinism.

For example, with reference to FIG. 2, suppose a test case is designed to reach state E (i.e., the coverage task indicates that state E should be covered) and consists of stimulus X applied twice. The test execution engine applies X and observes that state B is reached—this is not wrong, but it will not achieve the goal of reaching state E, so the execution engine can abort the test case and rerun it from A. This time, assume that the AUT reaches state D so it applies stimulus X again. With luck, state E is reached and the execution engine can move on to the next test case. However, it is also possible that the state reached is H, so the process must start again from A. If this time state C is reached, then a bug has been identified, since applying X at state A should only produce either state B or state D.

Figure 3:
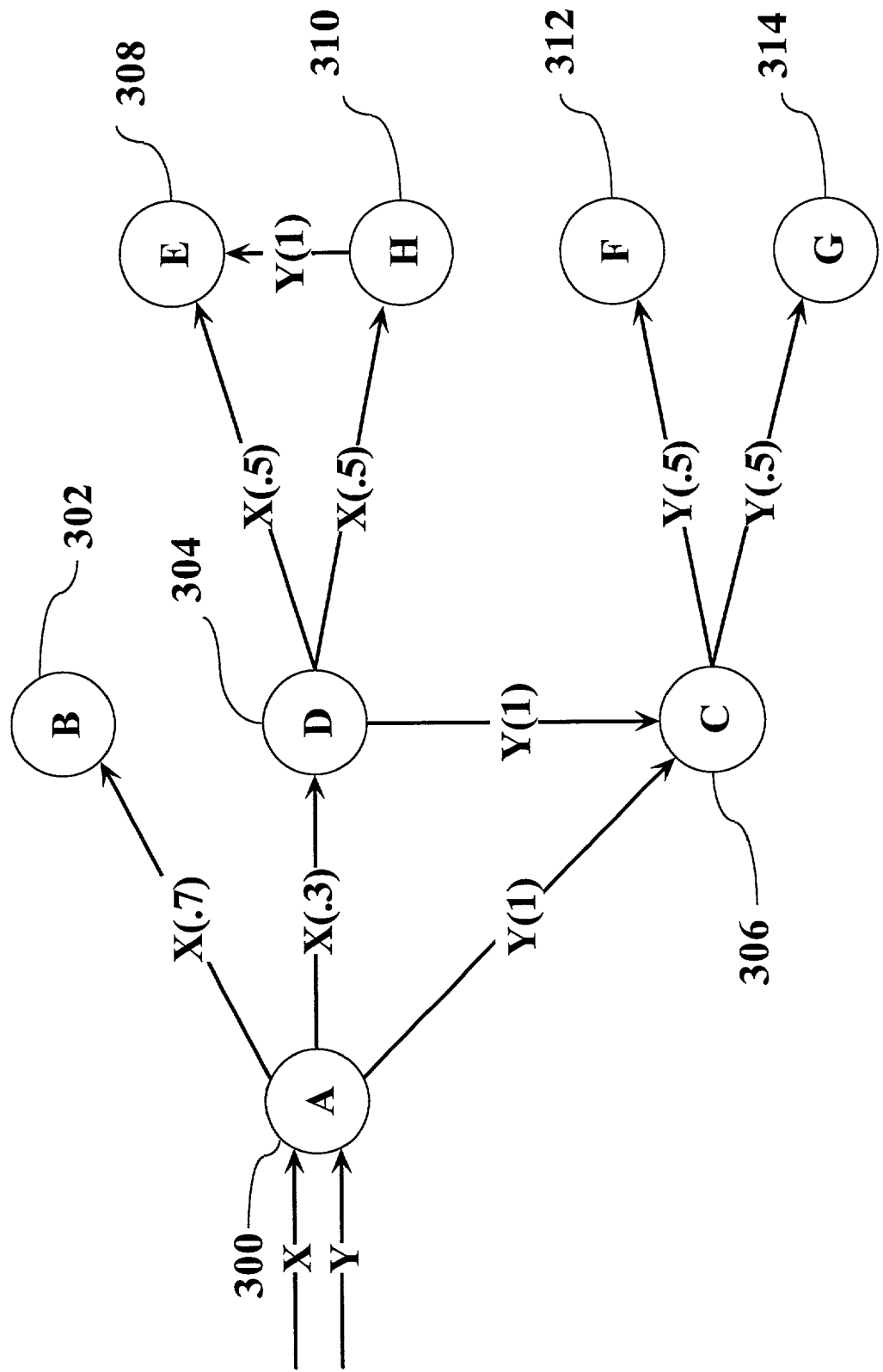
FIG. 3 illustrates a preferred embodiment in which statistical distribution tags are associated with possible outcomes.

FIG. 3 illustrates a preferred embodiment in which statistical distribution tags are associated with each possible outcome, thereby attaching a probability to each outcome which is used, in accordance with the present invention, to improve the ability to reach the coverage goal using the most efficient path. The probabilities are assigned by the modeler based on his or her belief as to how they think the AUT will behave or how it will be used.

Referring to FIG. 3, with respect to current state A, the two potential outcomes of applying stimulus X to state A are assigned probabilities of 0.7 (A to B) and 0.3 (A to D). Since there is only one outcome resulting from the application of stimulus Y to state A, it receives a probability of 1 (A to C). The sum of the probabilities of all outcomes resulting from the same stimulus should be 1. The potential outcome states of applying stimulus X to state D are assigned probabilities of 0.5 (D to E) and 0.5 (D to H); the potential outcome of applying stimulus Y to state D is assigned the probability of 1 (D to C); the potential outcome of applying stimulus X to state C are assigned probabilities of 0.5 (C to F) and 0.5 (C to G). By assigning the probabilities to the potential outcomes, a test generator can use the probabilities to come up with test cases with a better chance of achieving their goal.

An example illustrates the benefits of both non-probability based and probability-based testing in accordance with the present invention. Referring to FIG. 2, if the test generator is tasked to generate a test that reaches state F from state A, based on knowledge of the potential paths alone as shown in FIG. 2, one method of doing this would be to apply stimulus X to current state A, resulting in a "not-F" condition (i.e., either B or D will be reached), then apply stimulus Y to current state A, reaching C, and then applying Y to C, which will hit either F or G. This works adequately and the modeler is able to reach the desired state F with relatively good efficiency.

If the probabilities of FIG. 3 are known in advance, however, an alternative, and better method in accordance with the present invention is to apply stimulus Y first, which is guaranteed to reach state C (100% probability) and then apply stimulus Y again to state C with a 50% chance of achieving F (the other 50% chance would be that G would be achieved). It is clear from analyzing the probabilities that the second option has a better chance of getting to F at the first or second try (with respect to state C), whereas the first (non probability-based) method will take several more tries to reach state F. Armed with the knowledge of these probabilities, a "smart" test generator will use the probabilities to achieve test cases with a better chance of reaching their goal.

Figure 4:
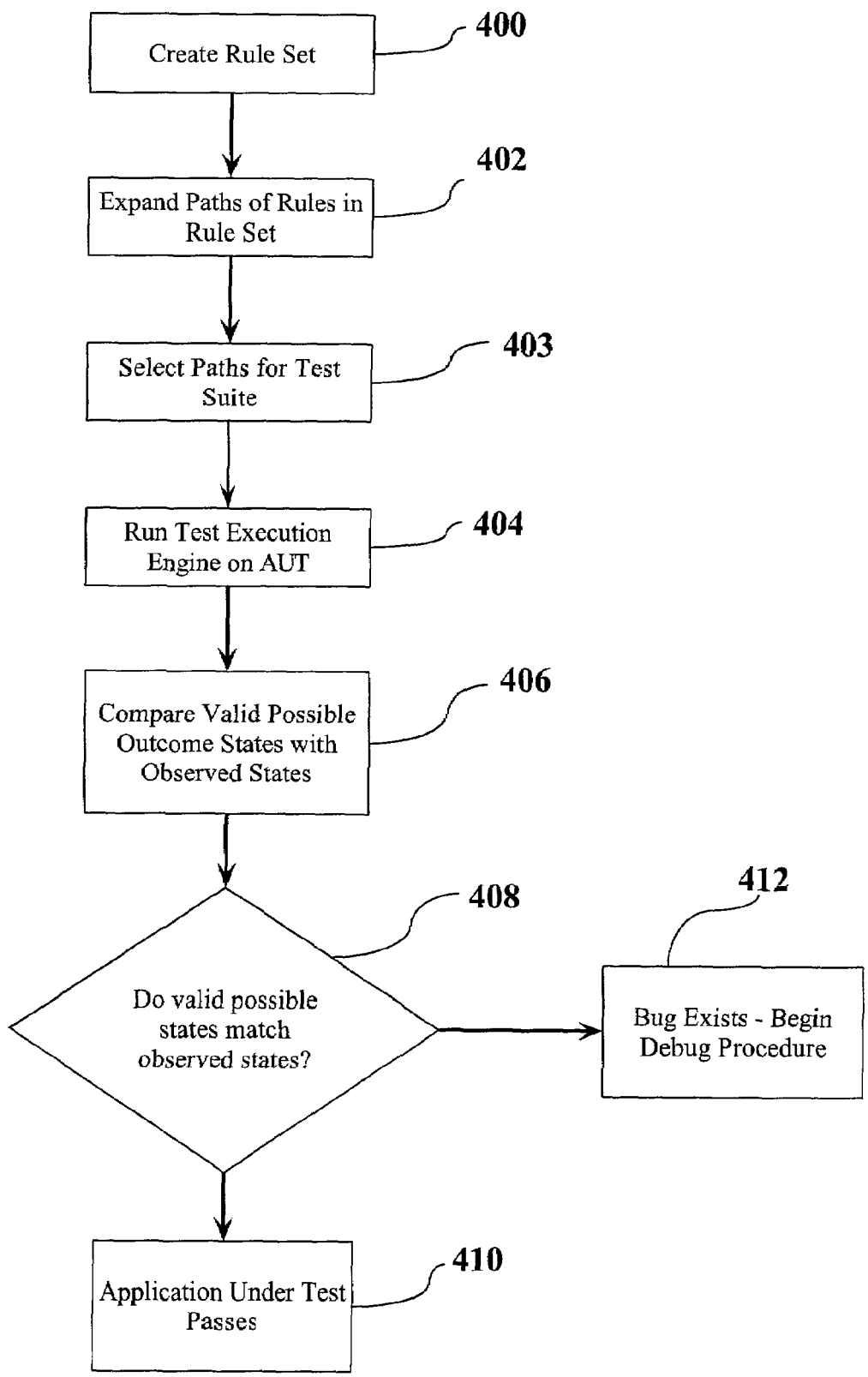
FIG. 4 is a flowchart illustrating the basic steps performed in connection with the present invention.

FIG. 4 is a flowchart illustrating the basic steps performed by the present invention. At step 400, a behavioral rule set is created. This step involves the writing of a name, a precondition, and a procedure for computing outcome states and their probabilities for each stimulus to be applied during testing.

At step 402, the paths of the rule set created in step 400 are recursively expanded using the test generator and the Reachable Set and possible paths are identified and listed. This is the exploration process by which the effects of applying stimuli to all states are identified and the paths resulting therefrom are established. As a result of performing this exploration, a list of all possible states of the application is compiled, and moreover, a list of coverage tasks is identified.

At step 403 the test generator selects sequences of stimuli (paths) to reach each of the coverage tasks. In the preferred embodiment, the choice of sequences of stimuli is influenced by the probabilities and by the testing philosophy and economic factors (e.g., long paths, short paths, rambling paths, random paths, high probability of success paths, cost of running tests). The choice of paths may also be influenced by the search algorithm used in step 402, and the availability of computing resources to the test generation program. Steps 402 and 403 may take place in sequence or may be interleaved (on-the-fly test generation).

At step 404, a test execution engine is run on the application under test using the test sequences output by the test generator, including information on possible outcomes, their probabilities, and possible alternative paths to achieve the goal of each test case. During this step, the paths are executed by applying the stimuli and compiling a sequence of observed states resulting from the application of the stimuli and, at step 406, the states that are observed are compared with the valid possible outcome states.

The comparison of the observed states with the valid possible outcome states occurs one at a time, as they are reached. At each step of each test case, three possible things can happen:

1. If the observed state does not match one of the valid possible outcome states, then a bug has been detected.

2. If the observed state matches one of the valid outcome states, but does not lead towards the goal of the test case, then the test case may be restarted. Note that no bug has been detected.

3. If the observed state matches one of the valid outcome states, and leads towards the goal of the test case, then the process proceeds to the next execution step.

If step 2 occurs frequently, then this may indicate the existence of a bug, but not conclusively. This may warrant additional investigation to identify possible bugs.

If, at step 408, it is determined that the observed states match the valid possible outcome states, and each of the coverage goals of each test case has been reached, then at step 410 a determination is made that the application under test is functioning properly, i.e., the test is considered a "pass". Alternatively, however, if at step 408 it is determined that the observed states do not match the valid possible outcome states, at step 412 the debugging process is carried out to identify where problems exist in the application under test.

By using the novel method of the present invention, a test generation program analyzes outcomes from application of stimuli to particular states, and if an acceptable result is not achieved after a predetermined number of attempts, alternate routes can be identified and utilized to reach the coverage goal. For example, referring again to FIG. 3, if a particular coverage goal is to cover (i.e., "reach") state E, and after applying stimulus X twice (once to state A and once to state D), state H is reached instead of the desired state E, the test execution engine possesses the "knowledge" that applying stimulus Y to state H will directly reach state E from H. This saves execution time, since the alternative would be to reapply stimulus X to state A, then again apply stimulus X to state D, and hope that, this time, state E is reached.

An example of the output of the test selection process for the above-described scenario is as follows:

TestCase:
Goal: reaching state E.
Step 1: Initialize the system in State A
Step 2: Apply stimulus X, and observe the resulting state of the system.
   If state B is reached and has been so-reached more that 10 times—output suspiciously high probability of reaching B.
   If state B is reached and has been so-reached less than 10 times, go back to Step 1.
   If state D is reached, go to step 3.
   If neither state B or D is reached—output "bug found."
Step 3: Apply stimulus X, and observe the resulting state of the system.
   If state E is reached—output "test passed and achieved goal."
   If state H is reached, go to step 4.
   If neither state E or H is reached—output "bug found."
Step 4: Apply stimulus Y and observe the resulting state of the system.

If state E is reached—output "test passed and achieved goal."
If state E is not reached—output "bug found."
EndTestCase The difference between the test case of the present invention described above and the prior art "linear" non-deterministic test case is that the standard non-deterministic test case only has execution steps as follows:

Step i: Apply the prescribed stimulus and observe the result:
If the desired valid outcome state is reached, go to step i+1
If any other valid outcome state is reached, go back and start the test case again.
If an invalid outcome state is reached—output "bug found."

While the structure of the present invention is more complex, the results achieved from using the structure are superior to those of the prior art.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method for testing, based on coverage goals, a software application under test (AUT) having plural paths reaching one or more non-deterministic outcomes, said method comprising the steps of:
   identifying all possible paths for achieving said coverage goals;
   identifying a sequence or set of sequences of stimuli to apply to maximize the likelihood that a particular coverage goal will be achieved; and
   applying said identified stimuli sequence to said AUT; said application of said identified stimuli sequence resulting in a non-deterministic outcome.

2. A method as set forth in claim 1, further comprising the steps of:
   determining the most efficient path for achieving said coverage goals;
   identifying a sequence of stimuli to apply to cause said most efficient path to be followed; and
   applying to said AUT said sequence of stimuli identified as causing said most efficient path to be followed.

3. A method as set forth in claim 2, wherein each path includes a current state and one or more valid outcome states, and wherein said step of determining the most efficient path for achieving said coverage goals comprises at least the steps of:
   assigning a probability designation to each of said current states and said valid outcome states, each said probability designation identifying the probability that a stimulus input to one of said current states will reach one of said valid outcome states; and
   identifying as said most efficient path the path that has the highest probability designations.

4. A method as set forth in claim 3, further comprising the step of:
   using an execution engine to apply said identified stimuli sequence to said AUT, said execution engine identifying invalid outcome states resulting from the input of a valid stimulus to a current node, thereby exposing bugs in said AUT.

5. A method as set forth in claim 1, further comprising the steps of:
   determining the most desirable path for achieving said coverage goals;
   identifying a sequence of stimuli to apply to cause said most desirable path to be followed; and
   applying to said AUT said sequence of stimuli identified as causing said most desirable path to be followed.

6. A system for testing, based on coverage goals, a software application under test (AUT) having plural paths reaching one or more non-deterministic outcomes, said system comprising:
   means for identifying all possible paths for achieving said coverage goals;
   means for identifying a sequence or set of sequences of stimuli to apply to maximize the likelihood that a particular coverage goal will be achieved; and
   means for applying said identified stimuli sequence to said AUT; said application of said identified stimuli sequence resulting in a non-deterministic outcome.

7. A system as set forth in claim 6, further comprising:
   means for determining the most efficient path for achieving said coverage goals;
   means for identifying a sequence of stimuli to apply to cause said most efficient path to be followed; and
   means for applying to said AUT said sequence of stimuli identified as causing said most efficient path to be followed.

8. A method as set forth in claim 7, wherein each path includes a current state and one or more valid outcome states, and wherein said means for determining the most efficient path for achieving said coverage goals comprises at least:
   means for assigning a probability designation to each of said current states and said valid outcome states, each said probability designation identifying the probability that a stimulus input to one of said current states will reach one of said valid outcome states; and
   means for identifying as said most efficient path the path that has the highest probability designations.

9. A system as set forth in claim 8, further comprising:
   an execution engine to apply said identified stimuli sequence to said AUT, said execution engine identifying invalid outcome states resulting from the input of a valid stimulus to a current node, thereby exposing bugs in said AUT.

10. A system as set forth in claim 6, further comprising:
    means for determining the most desirable path for achieving said coverage goals;
    means for identifying a sequence of stimuli to apply to cause said most desirable path to be followed; and
    means for applying to said AUT said sequence of stimuli identified as causing said most desirable path to be followed.

11. A computer program product in a computer readable medium for testing, based on coverage goals, a software application under test (AUT) having plural paths reaching one or more non-deterministic outcomes, said computer program product comprising:
    first instruction set for identifying all possible paths for achieving said coverage goals;
    second instruction set for identifying a sequence or set of sequences of stimuli to apply to maximize the likelihood that a particular coverage goal will be achieved; and
    third instruction set for applying said identified stimuli sequence to said AUT; said application of said identified stimuli sequence resulting in a non-deterministic outcome.

12. A computer program product as set forth in claim 11, further comprising:

fourth instruction set for determining the most efficient path for achieving said coverage goals;

fifth instruction set for identifying a sequence of stimuli to apply to cause said most efficient path to be followed; and sixth instruction set for applying to said AUT said sequence of stimuli identified as causing said most efficient path to be followed.

13. A computer program product as set forth in claim 12, wherein each path includes a current state and one or more valid outcome states, and wherein said fourth instruction set comprises at least:

first instruction sub-set for assigning a probability designation to each of said current states and said valid outcome states, each said probability designation identifying the probability that a stimulus input to one of said current states will reach one of said valid outcome states; and second instruction sub-set for identifying as said most efficient path the path that has the highest probability designations.

14. A computer program product as set forth in claim 13, further comprising:

seventh instruction set for applying said identified stimuli sequence to said AUT, said seventh instruction set identifying invalid outcome states resulting from the input of a valid stimulus to a current node, thereby exposing bugs in said AUT.

15. A computer program product as set forth in claim 11, further comprising:

fourth instruction set for determining the most desirable path for achieving said coverage goals;

fifth instruction set for identifying a sequence of stimuli to apply to cause said most desirable path to be followed; and sixth instruction set for applying to said AUT said sequence of stimuli identified as causing said most desirable path to be followed.

* * * * *